United States Patent Office 3,138,534
Patented June 23, 1964

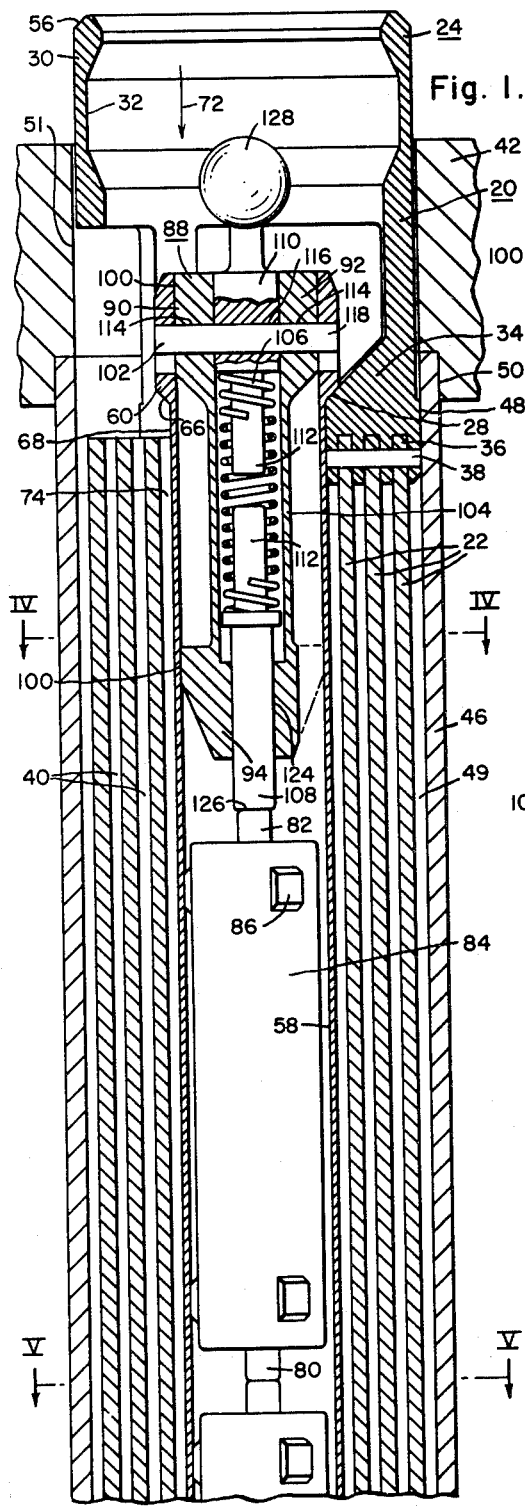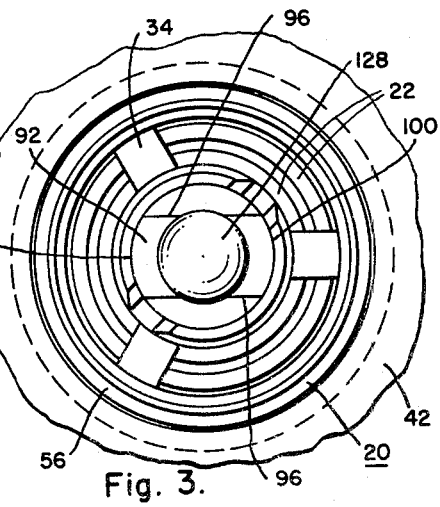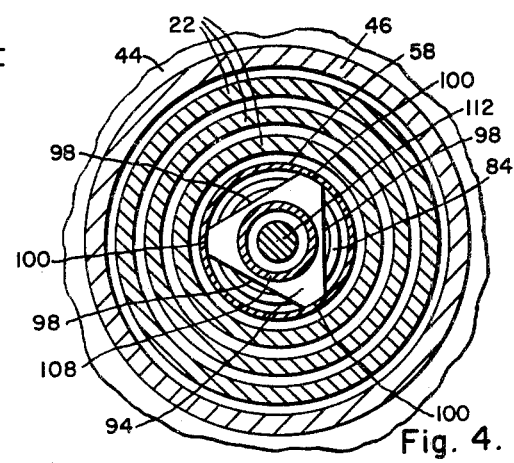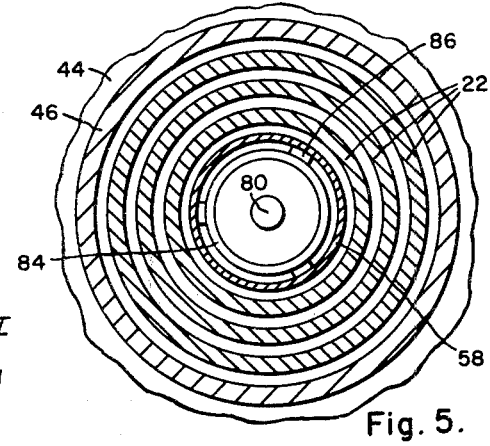

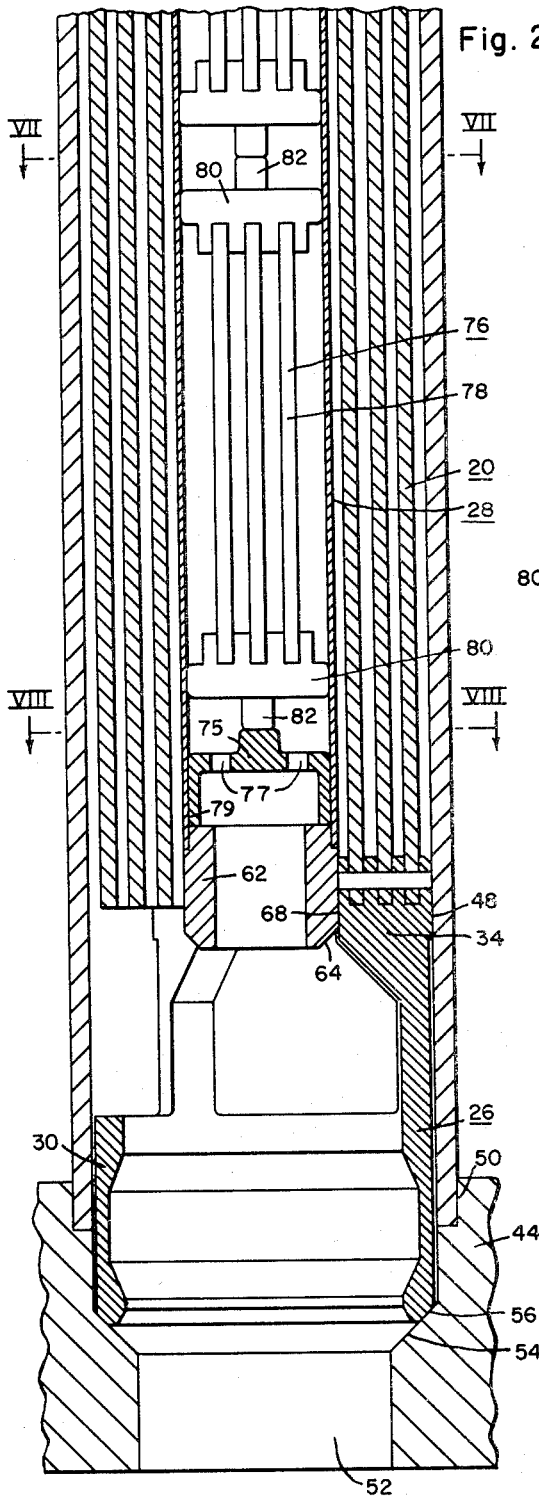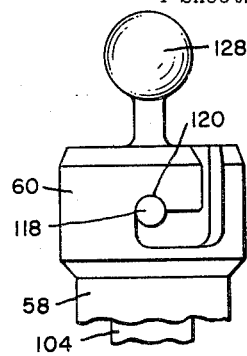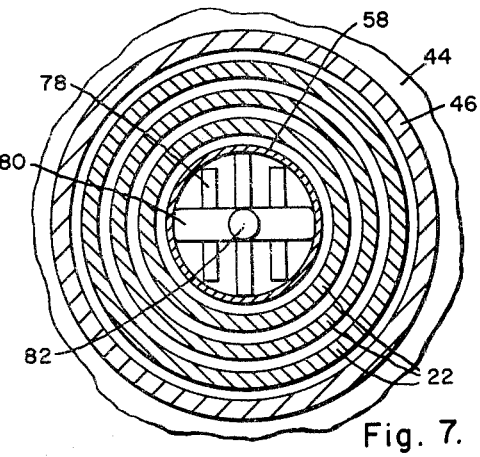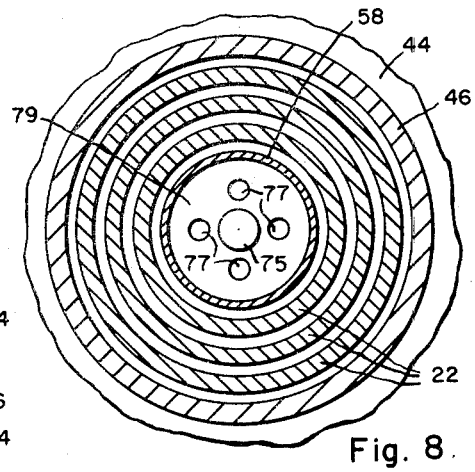

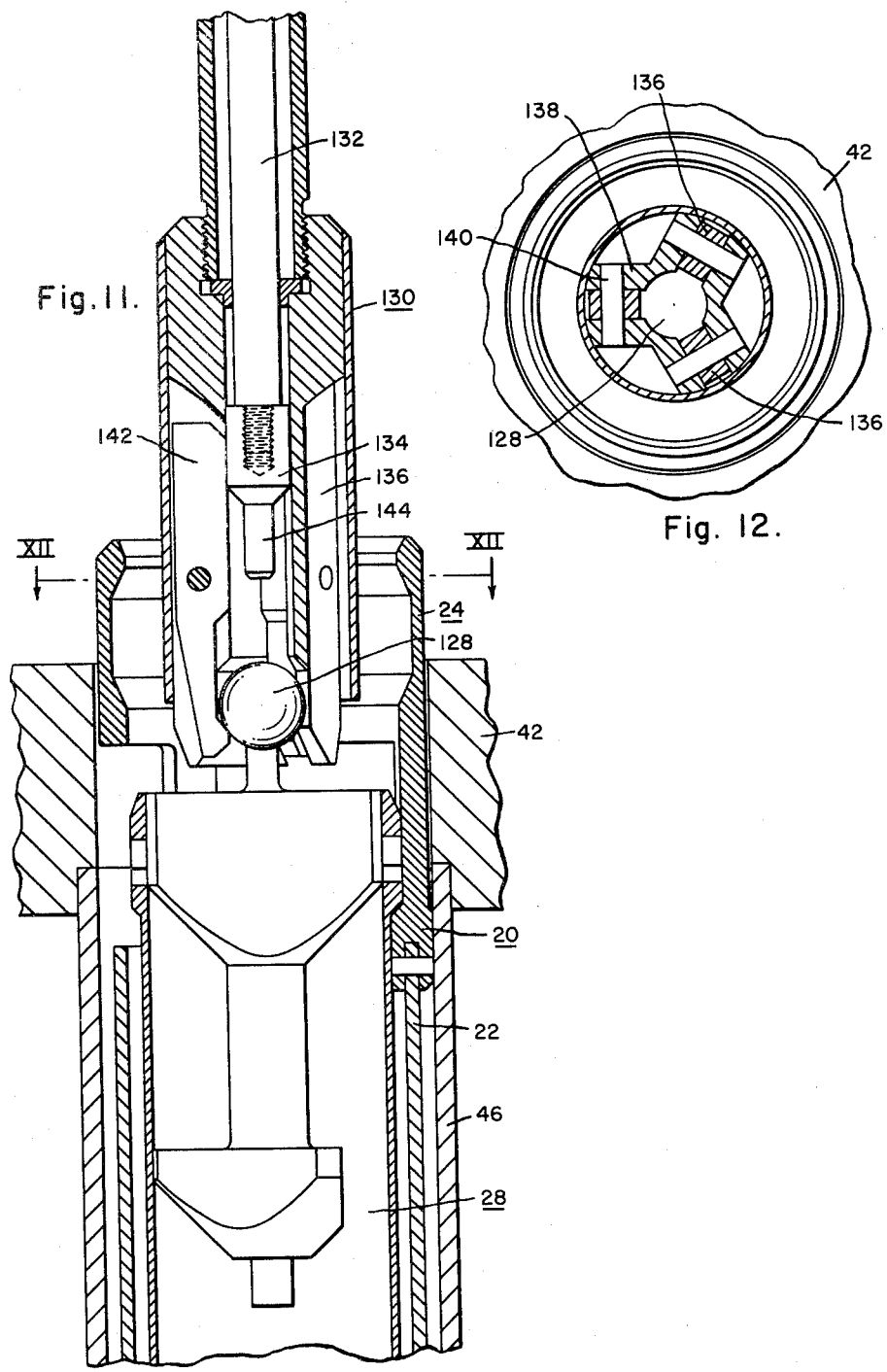

3,138,534
FUEL ARRANGEMENT FOR A NEUTRONIC
TEST REACTOR
Erling Frisch, Oakland, and Mortimer A. Schultz,
Squirrel Hill, Pa., assignors to Westinghouse Electric Corporation, East Pittsburgh, Pa., a corporation of Pennsylvania
Filed Sept. 6, 1960, Ser. No. 53,933
7 Claims. (Cl. 176—18)

The present invention relates to fuel arrangements for neutronic reactors and, more particularly, to fuel arrangements having means for supporting specimens for testing purposes.

Where the significant parameters of a neutronic reactor are provided principally for enabling the reactor to be used for testing purposes, it is desirable that the fuel arrangement or assembly of the reactor be so provided as to include means for supporting specimens in regions of relatively maximum neutronic flux density. Otherwise, to obtain a given amount of radiation exposure at some other position relative to the reactor core the reactive capacity of the fuel arrangement would have to be enlarged or the amount of exposure time of the specimen would have to be increased. In addition, it is desirable that the specimen supporting means be provided in relatively simple form so that insertion and removal of test specimens are facilitated.

For an example of a neutronic reactor which can be used for testing purposes, reference is to be made to a copending application of E. Frisch, entitled "Nuclear Reactor," Serial No. 610,821, filed September 19, 1956, and assigned to the present assignee. Since the test reactor disclosed there is described in full detail, it will only be necessary here to describe the present fuel arrangement to the extent necessary for a full understanding of the invention. Thus, if desired, the present fuel arrangement as embodied in accordance with the principles of the invention can be used as a part of the reactor described in the copending application, but its use is obviously not limited thereto.

Accordingly, it is an object of the invention to provide a fuel arrangement for a neutronic reactor having novel means for supporting test specimens.

It is another object of the invention to provide, in a fuel assembly for a neutronic reactor, individual fuel elements which have means for supporting test specimens incorporated therewith so as to enable the specimens to be located in or near maximum neutronic flux regions of the reactor.

A further object of the invention is to provide a fuel element which forms part of a fuel assembly in a neutronic reactor and which is provided in elongated form to enclose a longitudinally extending space in which test specimens can be supported so as to enable the specimens to be inserted into and removed from the reactor in a speedy manner.

It is another object of the invention to provide a fuel element including a plurality of concentrically positioned, elongated, fuel bearing tubes of varying diameter, one or more inner ones of which can be removed to increase the diametrical size of a passage which is located centrally and axially of the tubes and which enables test specimens to be supported inwardly of the tubes.

It is another object of the invention to provide a fuel element of the concentric type described in the preceding object, with the further provision of means for supporting the test specimens in the centrally located passage of the fuel element including a tubular holder which houses the specimens, which can be readily inserted into the passage for support by the fuel element and which can be readily removed therefrom.

Still another object of the invention is to provide a fuel element having means for supporting test specimens in such a manner that the coolant flow adjacently of the specimens can be readily varied.

It is a further object of the invention to provide a fuel arrangement or assembly including a tubular fuel element having a centrally located specimen holder and having means enabling it to be placed as desired relative to the fuel assembly and enabling ready placement of the holder relative to the fuel element.

Another object of the invention is to provide a fuel element as described in the preceding object in which the enabling means includes a nozzle so formed as to enable a handling tool to grip its inner side for placement of the fuel element and so as to enable another handling tool to grip the holder for placement of the same.

These and other objects will become more apparent upon consideration of the following detailed description of an embodiment of the invention along with the accompanying drawings, in which:

FIGURE 1 is a longitudinally sectioned view of an upper portion of a fuel element adjacent part of the upper core supporting plate and provided in accordance with the principles of the invention;

FIG. 2 is a longitudinally sectioned view of part of a lower core supporting plate and a lower portion of the fuel element shown in FIGURE 1;

FIG. 3 is a partial top plan view of the fuel element and the upper supporting plate shown in FIGURE 1;

FIG. 4 is a sectional view of the fuel element taken along the reference line IV—IV of FIGURE 1;

FIG. 5 is a sectional view of the fuel element taken along the reference line V—V of FIGURE 1;

FIG. 6 is a partial elevational view of a specimen holder which can be used with the fuel element shown in FIGURE 1;

FIG. 7 is a sectional view of the fuel element taken along the reference line VII—VII of FIGURE 2;

FIG. 8 is a cross-sectional view of the fuel element taken along the reference line VIII—VIII of FIG. 2;

FIG. 11 is a partial, longitudinally sectioned view of the fuel element similar to the view shown in FIGURE 9 with another handling tool shown here for placement of the specimen holder mentioned in connection with FIG. 6; and FIG. 12 is a cross-sectional view of the other handling tool taken along the reference line XII—XII of FIGURE 11

Figure 10:
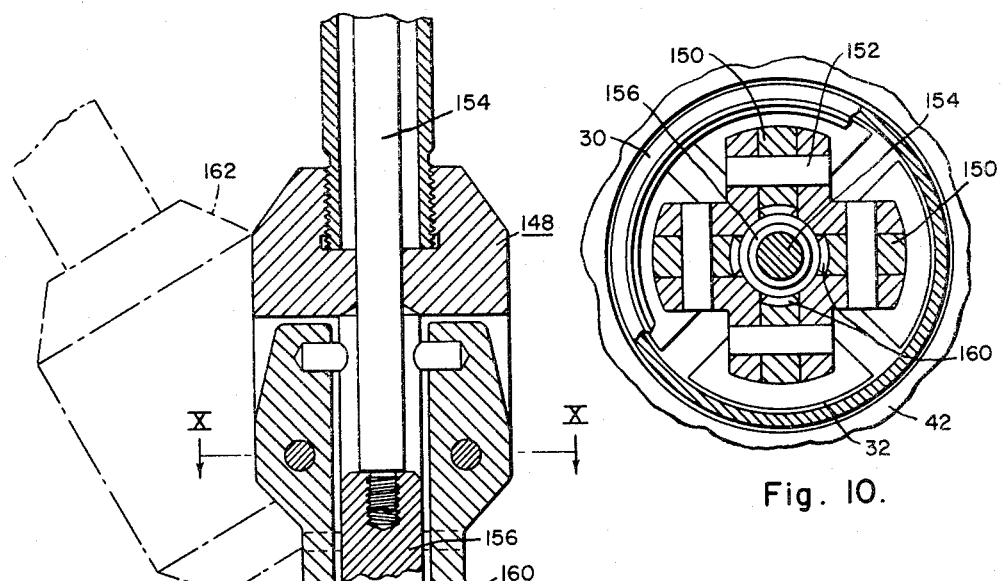
FIG. 10 is a cross-sectional view of the one handling tool taken along the reference line X—X of FIGURE 9.

With reference to FIGURES 1 through 3, a fuel element 20 is provided for use along with other fuel elements in forming a fuel assembly in the reactive region of a neutronic reactor. The fuel element 20 is embodied in this instance as a combination of physical elements including a plurality of coaxially positioned fuel tubes 22 and upper and lower nozzles 24 and 26, respectively, through which a suitable coolant can flow for the purpose of removing generated heat from the fuel element 20. For testing purposes, means are provided including a tubular holder 28 for supporting test specimens centrally or inwardly of the fuel element 20.

Each of the nozzles 24 or 26 is provided with an annular rim portion 30 having an inwardly facing recess 32. The recess 32 enables a handling tool, which will be described subsequently, to be used in placing the fuel element 20. The nozzles 24 and 26 are also provided with laterally inwardly extending spokes 34 whose radial inward extent is limited to provide for entry and removal of the specimen holder 28 relative to the fuel tubes 22.

The spokes 34, as used here provide means for supporting the fuel tubes 22 relative to each other. Thus, circumferential grooves 36 are employed annularly to seat the fuel tubes 22, respectively, relative to the nozzles 24 and 26 and, therefore, relative to each other. To secure the fuel tubes 22 in the seating relation just considered, a pin 38 can be engaged with each spoke 34 to extend radially inwardly of the nozzles 24 and 26 through openings in the fuel tubes 22. As will subsequently be described more fully, the spokes 34 can also be employed to provide support for the specimen holder 28 relative to the fuel element 20.

It is to be noted at this point in the description that the fuel tubes 22, as supported, are spaced from each other to provide annular channels 40 extending axially of the fuel element 20 to provide for adjacent flow of coolant. Of course, the flow of coolant through the nozzle 24 into the channels 40, and other axial flow channels yet to be described within the fuel element 20, and through the nozzle 26 is not significantly impeded by the presence of the nozzle spokes 34.

To provide for supporting the fuel element 20 and other fuel elements in the form of an assembly and thereby to provide a reactive region in the aforementioned reactor, means including an upper support plate 42 and a lower support plate 44 can be employed. The support plates 42 and 44 can be supported relative to each other, for example by means including a cylindrical member (not shown) as more fully considered in the aforementioned copending application of E. Frisch.

In this instance, a guide sleeve 46 is a also included to provide support for the fuel element 20. Thus, the sleeve 46 is positioned to extend from the upper support plate 42 to the lower support plate 44 so as to support laterally the fuel element nozzles 24 and 26 as indicated by the reference character 48. The respective ends of the sleeve 46 are engaged with the support plates 42 and 44 in annular notches 50. If desired, the described engaging relation of the ends of the sleeve 46 relative to the support plates 42 and 44 can be made a secured one or sealed one or both through a welding operation or by other suitable means. The notches 50 are respectively located adjacently of channels 51 and 52, which in turn, are located in aligned relation in the support plates 42 and 44 and which extend into the space enclosed by the sleeve 46.

As can readily be observed in FIGURE 2, the means for supporting the fuel element 20 also include a chamfered surface 54 located adjacently of the lower support plate channel 52. Thus, a chamfered outer surface 56 on the nozzle rim portion 30 matingly engages the lower support plate surface 54 to provide support for the fuel element 20.

The specimen holder 28, as previously noted, enables test specimens to be supported inwardly of the fuel element 20 where the neutronic flux density created by an undergoing chain reaction in the aforementioned reactor exists with a relatively high value. It includes an elongated tubular casing 58 having an outwardly extended flange portion 60 adjacent its upper end and an inwardly extended flange portion 62 adjacent its lower end. An outer surface 64 on the lower flange portion 62 is chamfered to facilitate entry of the holder 28 into the cylindrical space existing inwardly of the innermost fuel tube 22. As determined from FIGURE 1, the upper flange portion 60 is provided with an outer chamfered surface 66 which is supportingly engaged by the spokes 34 of the upper nozzle 24. It is to be noted that lateral support is provided for the lower holder portion 62 by an inner surface 68 of the spokes 34 of the lower nozzle 26. An identical surface 68 on the spokes 34 of the upper nozzle 24 also provides lateral support for the holder 28.

Thus, when fully inserted within the fuel element 20, the holder 28 is firmly held against axial as well as lateral movement, particularly in that this embodiment of the invention calls for a flow of coolant to proceed along the direction indicated by the reference arrow 72. In this connection, the holder 28 is so located in its supported position that an annular coolant channel 74 extends axially between the outer surface of the holder casing 58 and the inner surface of the inner one of the fuel tubes 22. It is also to be noted that the outer one of the fuel tubes 22 is positioned inwardly of the sleeve 46 so that a coolant channel 49 is provided for flow in addition to that provided by the coolant channels 40 and the channel 74.

Means are provided for controlling the flow of coolant inwardly of the specimen holder casing 58, here through the use of an orificed member or cup 75 having a rim portion 79 supported upon the lower flange portion 62. The size and number of orifices 77 provided in the cup 75 are, of course, determinative of the rate of coolant flow through the holder casing 58 for any given temperature and pressure conditions.

As examples of the form that can be provided for specimens to be inserted in the holder 28, several illustrative embodiments are presented here. A specimen 76 (FIG. 2) can be employed to provide radiation test results for materials in the form of sheets 78. The sheets 78 are supported between opposite guiding bars 80 which are provided with an outwardly extended spacer 82 to ensure free circulation of coolant along the specimens 76 when supported in tandem relation.

If it is desired that the material to be tested be not exposed to any corrosive effects of the fluid which is selected for cooling purposes, a cartridge 84 (FIG. 1), within which the material to be tested is hermetically enclosed, can be employed. Spacers 82 are also employed here and, in addition, projections 86 are provided on the outer surface on the cartridge 84 so as to space the cartridge 84 from the inner surface of the holder casing 58 and therefore to enable coolant to flow externally along the cartridge 84. It is clear, therefore, that a plurality of specimens 76 or cartridges 84 or both can be supported within the holder 28 in tandem relation, with the number being determined by their length and by the length accorded to the holder casing 58.

To provide means for resiliently retaining the specimens 76 and cartridges 84 within the holder 28, a plug 88 is supported adjacent the upper holder portion 60. The plug 88 includes a body member 90 having upper and lower support portions 92 and 94 being machined as indicated by the reference characters 96 and 98 (FIG. 4), respectively, to provide for flow of coolant axially of the holder 28. The supporting relation of the portions 92 and 94 relative to the holder casing 58 exists as a result of sides 100 of the plug portions 92 and 94 engaging the inner wall surface of the holder casing 58.

In addition, means are provided for securing the plug 88 substantially against unitary axial movement relative to the holder casing 58 through the use of a pin 102. Extending between the plug portions 92 and 94 and completing the body portion 90, a cylindrical portion 104 is provided for housing a spring 106, here in coiled form, and for enabling resilient sliding movement of a plunger 108. To retain the spring 106 within the plug cylindrical portion 104, a stopper 110 is employed.

The stopper 110 includes a downwardly extending shaft 112 which projects through the spring coils and provides retaining support for the spring 106 and which provides guidance for the sliding movement of the plunger 108. The securing pin 102 extends through an opening 114 in the plug support portion 92 and through an opening 116 in the stopper 110 to support the stopper 110 relative to the plug body member 90. As viewed in FIGURE 6, ends 118 of the pin 102 are engaged with the holder casing 58 in a bayonet-type gripping relation. Of course, the forces of the spring 106 ensure that the pin ends 118 are biased upwardly to hold the plug 88 in latched relation to the holder casing 58 as indicated by the reference character 120.

As viewed in FIGURE 1, the plunger 108 extends through an opening 124 in the plug support portion 94 to engage the spacer 82 of the adjacent cartridge 84 or specimen 76 as indicated by the reference character 126. It is clear that when a suitable number of specimens 76 and cartridges 84 are deposited within the holder casing 58 a retained assembly of these members relative to the specimen holder 28 is obtained when the plug 88 is secured to the holder casing 58 in the manner just described. Of course, by adjusting the size of the specimens 76 and the cartridges 84 and the various elements of the plug 88, any desired number of specimens 76 and cartridges 84 can be supported within the holder 28.

To this point in the description, the structure of the fuel element 20 and of the specimen holder 28 and the operative aspects of this structure have been set forth. The dimensional and other parameters and the materials selected for use will, of course, be determined through design considerations. For example, light water can be employed efficiently to function principally as a coolant flowing as indicated by the path 72, with another fluid having desirable moderating properties flowing outwardly of the guide sleeve 46 in a manner indicated more fully in the aforementioned copending application.

For another example, if the selected operating temperature and pressure of the employed coolant are accommodating, aluminum can be used to form many if not all of the structural elements described here. In the instance of the fuel tubes 22, an alloy of aluminum and U235, with the quantity of the latter being determined by critical mass considerations, by neutronic flux objectives and by other factors, can be clad with aluminum in plate form and subsequently rolled and secured in tubular form. As a final example, the dimensional parameters of the structural elements described here would also be determined by necessary strength objectives, by neutron flux objectives, by the specimen holding capacity desired and by other significant factors ordinarily considered by those skilled in the pertaining art. Additional considerations relevant to the reactor design are set forth in the aforementioned copending application of E. Frisch.

It is to be noted that the specimen holder 28 can be positioned in and removed from the fuel element 20 in a ready manner. Thus, the nozzle 24 is so formed as to enable insertional and removal movement of the holder 28 relative to the fuel element 20 without requiring removal of the fuel element 20 from its supported position in the reactive region of the aforementioned reactor. Notwithstanding this feature of the invention, ready displacement of the fuel element 20 from its supported position for inversion or for rearrangement or for removal relative to the reaction region is enabled through the use of the recesses 32 provided in the nozzle 24 and a handling tool subsequently to be described.

To provide for insertion and removal of the specimen holder 28, the holder plug 88 is provided with a knob 128 as a part of the stopper 110. A handling tool 130, as viewed in FIGS. 11 and 12, can be employed for securingly engaging the knob 128 to position the holder 28. A shaft 132 having a cam portion 134 is included for controlling movement of latching arms 136. The arms 136 are pivotally related to structural portions 138 of the tool 130 through the use of pins 140.

Longitudinal movement of the shaft 132 can be controlled by any suitable means provided at the upper end of the handling tool 130 (not shown). When the cam portion 134 is located in the position indicated in FIGURE 11, the latching arms 136 are held in position for latching engagement with the holder knob 128. When the tool shaft 132 is withdrawn so that the cam portion 134 is removed from its holding relation with the latching arms 136, the latching arms 136 are free to pivot so that upper portions 142 thereof move inwardly toward an extension 144 of the shaft 132 and so that the ends of the arms 136 are set free from their latching relation with the holder knob 128. It is to be noted that, in FIGURE 11, an embodiment of the invention is illustrated as including only one fuel tube 22. This demonstrates the flexibility of the invention when embodied in providing for various sizes of specimen holders 28.

Figure 9:
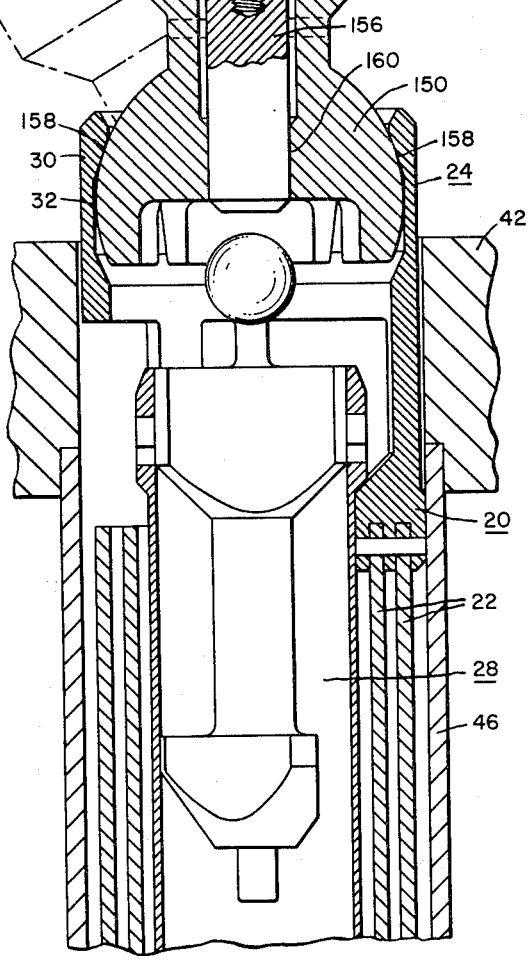
FIG. 9 is a partial, longitudinally sectioned view of the fuel element similar to the sectioned view shown in FIGURE 1, with one handling tool shown here for placement of the fuel element.

With reference to FIGURES 9 and 10 a handling tool 148 is illustrated for use in positioning the fuel element 20. The handling tool 148 is also provided with a plurality of latching arms 150, similar to those described in connection with FIGURES 11 and 12, which are pivotally mounted through the use of pins 152. A shaft 154 having a cam portion 156 is employed for positioning the latching arms 150.

As viewed in FIG. 9, the latching arms 150 are positioned to engage the nozzle rim portion 30 in the recess 32 as indicated by the reference character 158. This, of course, is a direct result of the shaft cam portion 156 engaging inner portions of the arms 150 as indicated by the reference character 160.

When the shaft 154 is withdrawn by any suitable means provided at the upper end of the handling tool 148 (not shown), the cam portion 156 is removed from the engaging relation just described so that the latching arms 150 are free to pivot inwardly of the nozzle rim portion 30 to be free of the fuel element 20.

Similarly to FIGURES 11 and 12, it is to be noted that the embodiment of the invention illustrated in FIGURE 9 is so formed as to include two fuel tubes 22, again demonstrating the flexibility of the invention for application purposes. As indicated by dotted lines 162, it is also to be emphasized that the relation of the handling tool 148 to the fuel element nozzle 24 when engaged therewith is a swiveling one. Thus, the handling tool 148 can withdraw the fuel element 20 vertically from its supported position in the reactive region and subsequently transfer the fuel element 20 to a sloping chute (not shown) which may be provided in the reactor for transfer of the fuel element 20 externally for processing purposes.

In the foregoing description, the mode of operation of several arrangements of embodied elements has been related to point out the principles of the invention. The description, therefore, has only been illustrative of the invention, and, accordingly, it is desired that the invention be not limited by the embodiments described here but rather that it be accorded an interpretation consistent with the scope and spirit of its broad principles.

What is claimed is:

1. In a neutronic reactor having opposed upper and lower supporting plates, a fuel element comprising a plurality of elongated substantially coaxially-positioned fuel bearing tubes, means for supporting said fuel tubes relative to each other and relative to said supporting plates, said supporting means including a nozzle having an opening for coolant flow and being disposed adjacent each end of said fuel tubes, each of said nozzles having a plurality of spokes projecting inwardly of its opening to a limited extent, the ends of at least one of said fuel tubes being securingly supported by said spokes, said nozzles being supportingly positioned in a flow opening in said supporting plates, respectively, a tubular specimen holder insertable through the upper nozzle opening inwardly of the upper nozzle spokes to a position inwardly of the inner one of said fuel tubes, and means for supporting said holder in its inserted position, the last mentioned supporting means including an outwardly extending flange on said holder being supported by said upper nozzle spokes.

2. In a neutronic reactor having opposed supporting plates, a fuel element comprising a plurality of elongated substantially coaxially-positioned fuel bearing tubes, means for supporting said fuel tubes relative to each other and removably relative to said supporting plates, said supporting means including a nozzle having an opening for coolant flow and being disposed adjacent each end of said fuel tubes and supportingly engaging the same, said nozzles being supportingly positioned in a flow opening in said supporting plates, respectively, a specimen holder insertable through the upper nozzle opening to a position inwardly of the inner one of said fuel tubes, means forming a part of the upper nozzle for supporting said holder in its inserted position, and means for enabling said holder to be withdrawn from its inserted and supported position independently of said fuel element and for enabling said fuel element to be withdrawn from its supported position, said enabling means including a circumferential recess being provided on an inwardly facing surface of said upper nozzle and a latch portion on said holder located within said upper nozzle opening.

3. In a neutronic reactor having opposed upper and lower supporting plates, a fuel element comprising at least one elongated fuel bearing plate formed to enclose laterally an elongated space, means for supporting said fuel element relative to said supporting plates, said supporting means including a nozzle having an opening for coolant flow and being engaged with said plate adjacent one end of the latter and being supportingly positioned in a flow opening in said upper supporting plate, means for supporting at least one test specimen in said space, the last mentioned supporting means including an elongated hollow holder insertable into said space through said nozzle opening and having a lateral shoulder supported by said nozzle, said holder being open through at least one end thereof for entry of said specimen, said specimen being positionable in the hollow of said holder, a plug being secured to said holder adjacent its one end, and means for resiliently positioning said specimen relative to said holder, said plug being reduced in lateral cross-section to provide for a flow of coolant through said holder.

4. In a neutronic reactor having opposed upper and lower supporting plates, a fuel element comprising at least one elongated fuel bearing plate formed to enclose laterally an elongated space, means for supporting said fuel element relative to said supporting plates, said supporting means including a nozzle having an opening for coolant flow and being engaged with said plate adjacent one end of the latter and being supportingly positioned in a flow opening in said upper supporting plate, means for supporting at least one test specimen in said space, the last mentioned supporting means including an elongated hollow holder insertable into said space through said nozzle opening and having a lateral shoulder supported by said nozzle, said holder being open through at least one end thereof for entry of said specimen, said specimen being positionable in the hollow of said holder, a plug being secured to said holder adjacent its one end, means for resiliently positioning said specimen relative to said holder, said plug being reduced in lateral cross-section to provide for a flow of coolant through said holder, and a member which has orifices in selectable size and number being supportingly positioned to extend laterally of said holder to control the flow of coolant through said holder.

5. In a neutronic reactor having opposed upper and lower supporting plates, a fuel element comprising a plurality of elongated substantially coaxially-positioned fuel bearing tubes, means for supporting said fuel tubes relative to each other and relative to said supporting plates and for supporting at least one test specimen inwardly of the inner one of said fuel tubes said supporting means including a nozzle having an opening for coolant flow and being disposed adjacent each end of said fuel tubes, each of said nozzles having a plurality of spokes projecting laterally inwardly of its opening to a limited extent, the ends of at least some of said fuel tubes being securingly supported by said spokes, said supporting means including an elongated tubular specimen holder having a lateral flange adjacent one open end thereof and being supported by said nozzle spokes and having an elongated portion extending axially into said inner fuel tube, said specimen being positionable in said holder elongated portion, and said holder having a plug secured to its one end and retaining means for resiliently positioning said specimen relative to said holder, said plug being so cross-sectioned as to enable coolant to flow through said holder.

6. In a neutronic reactor having opposed upper and lower supporting plates, a fuel element comprising a plurality of elongated substantially coaxially-positioned fuel bearing tubes, means for supporting said fuel tubes relative to each other and relative to said supporting plates, said supporting means including a nozzle having an opening for coolant flow and being disposed adjacent each end of said fuel tubes and supportingly engaging the same, said nozzles being supportingly positioned in a flow opening in said supporting plates, respectively, a specimen holder insertable through the upper nozzle opening to a position inwardly of the inner one of said fuel tubes, and means forming a part of said upper nozzle and extending into the coolant opening thereof for supporting said holder in its inserted position while allowing coolant to flow along said tubes and through said upper nozzle.

7. In a neutronic reactor having opposed upper and lower supporting plates, a fuel element comprising at least one elongated fuel bearing plate formed to enclose laterally an elongated space, means for removably supporting said fuel plate relative to said supporting plates, said supporting means including a nozzle having an opening for coolant flow and being disposed adjacent each end of said fuel plate and supportingly engaging the same, said nozzles being supportingly positioned in a flow opening in said supporting plates, respectively, a specimen holder insertable longitudinally through the upper nozzle opening into said space, means forming a part of the upper nozzle and extending into the coolant opening thereof for supporting said holder in said space while allowing coolant to flow along said tubes and through said upper nozzle, and means on said holder and upper nozzle for enabling said holder to be withdrawn upwardly from its supported position independently of said fuel element and for enabling said fuel element to be withdrawn upwardly from its supported position.

References Cited in the file of this patent

UNITED STATES PATENTS

| | | |
|---|---|---|
| 2,874,106 | Hammond et al. | Feb. 17, 1959 |
| 2,926,127 | McCorkle | Feb. 23, 1960 |
| 2,984,609 | Dickson et al. | May 16, 1961 |
| 2,985,575 | Dennis et al. | May 23, 1961 |
| 3,014,856 | Nicklas | Dec. 26, 1961 |
| 3,015,616 | Sturtz et al. | Jan. 2, 1962 |

FOREIGN PATENTS

| | | |
|---|---|---|
| 753,130 | Great Britain | July 18, 1956 |

OTHER REFERENCES

Kruzhilin: International Conference on the Peaceful Uses of Atomic Energy, vol. 2, p. 444, August 1955. U.N. Publication, New York. Copy in Library.